United States Patent
Wilcox et al.

(10) Patent No.: US 6,532,074 B1
(45) Date of Patent: Mar. 11, 2003

(54) FREE-SPACE DIFFRACTION MEASUREMENT OF A PHASE MASK FOR FABRICATION OF A WAVEGUIDE BRAGG GRATING

(75) Inventors: Russell Wilcox, Fremont, CA (US); Jason Zweiback, Fremont, CA (US); HongPu Li, Fr, CA (US); Jan Popelek, Fremont, CA (US); Joshua E. Rothenberg, San Jose, CA (US)

(73) Assignee: Teraxion Inc., Sainte-Foy (CA)

( * ) Notice: Subject to any disclaimer, the term of this patent is extended or adjusted under 35 U.S.C. 154(b) by 0 days.

(21) Appl. No.: 09/870,925

(22) Filed: May 30, 2001

Related U.S. Application Data

(60) Provisional application No. 60/260,189, filed on Jan. 5, 2001.

(51) Int. Cl.[7] .................................. G01B 9/02
(52) U.S. Cl. ...................................... 356/521
(58) Field of Search ....................... 356/521; 250/237 G

(56) References Cited

U.S. PATENT DOCUMENTS

| RE33,581 | E | * | 4/1991 | Nicoli et al. ............... 435/7.2 |
| 5,448,355 | A | * | 9/1995 | Noguchi et al. ........... 356/521 |
| 5,576,829 | A | * | 11/1996 | Shiraishi et al. ........... 356/521 |
| 6,239,878 | B1 | * | 5/2001 | Goldberg .................... 356/521 |

OTHER PUBLICATIONS

U.S. patent application Ser. No. 60/260,189, Wilcox et al.

* cited by examiner

Primary Examiner—Robert H. Kim
Assistant Examiner—Thomas R Artman
(74) Attorney, Agent, or Firm—Fulbright & Jaworski L.L.P.

(57) ABSTRACT

Techniques for optically evaluating phase masks for fabricating waveguide Bragg gratings by measuring diffraction orders.

13 Claims, 2 Drawing Sheets

FREE-SPACE DIFFRACTION MEASUREMENT OF A PHASE MASK FOR FABRICATION OF A WAVEGUIDE BRAGG GRATING

This application claims the benefit of U.S. Provisional Application No. 60/260,189, filed on Jan. 5, 2001.

BACKGROUND

This application relates to optical Bragg gratings in optical waveguides, and more specifically, to techniques and systems associated with fabrication of such Bragg gratings.

Optical waveguides, such as optical fibers and planar dielectric waveguides formed on substrates, may be fabricated with spatial periodic grating patterns in their cores along the longitudinal direction to form Bragg gratings. Such a Bragg grating can interact with a guided optical signal to selectively reflect each spectral component $\lambda_B(z)$ that satisfies the Bragg condition, $\lambda_B(z)=2n_{eff}(z)\Lambda(z)$, and transmits other spectral components that fail the Bragg condition, where z represents the position along the waveguide, $n_{eff}(z)$ the effective index of refraction, and $\Lambda(z)$ the period of the grating. The grating parameter, $n_{eff}(z)\Lambda(z)$ may be a constant along the waveguide to produce Bragg reflection at a Bragg wavelength or a linearly or nonlinearly chirped function of the position z to produce Bragg reflection within a Bragg reflection band.

In addition, a spatial sampling pattern with a constant sampling period or a chirped sampling period greater than the grating period may be superimposed over and modulate the grating pattern. Such a sampled grating is operable to produce multiple Bragg reflective signals at different wavelengths when the underlying grating period is a constant and multiple Bragg reflective bands centered at different wavelengths when the underlying grating period is chirped.

One way of fabricating the above Bragg gratings, for example, is to use radiation-sensitive materials to form the waveguide core and expose the core to an interference pattern produced by illumination through a phase mask. The exposure produces a spatial grating pattern through the interference of at least two diffracted beams,. e.g., the ±1 diffraction orders, to modulate the refractive index of the waveguide core.

The final grating patterns, however, may have irregularities or errors caused by a number of factors in the fabrication process. For example, the waveguide core such as a fiber core, may not have a homogeneous spatial distribution of the radiation-sensitive dopants. As another example, the phase mask itself may have errors or defects. Those and other factors can collectively contribute to the irregularities or errors in the final grating patterns. Therefore, it may be desirable to distinguish and identify different contributions from various factors in order to improve the fabrication precision of the Bragg gratings.

SUMMARY

The present disclosure includes techniques to measure the feature parameters and performance of a phase pattern in a phase mask for fabricating Bragg gratings in optical waveguides. In one embodiment, the second-order diffraction of a phase mask, under proper optical illumination and detection, may be used to reproduce the spectrum of a waveguide Bragg grating formed from exposing the radiation-sensitive core to the interference pattern of two first-order diffraction beams from the phase mask. Hence, the second-order diffraction may be used as a diagnostic tool for evaluating the phase mask. In addition, other high-order diffraction beams may also be used to evaluate the phase mask.

DETAILED DESCRIPTION

Figure 1:
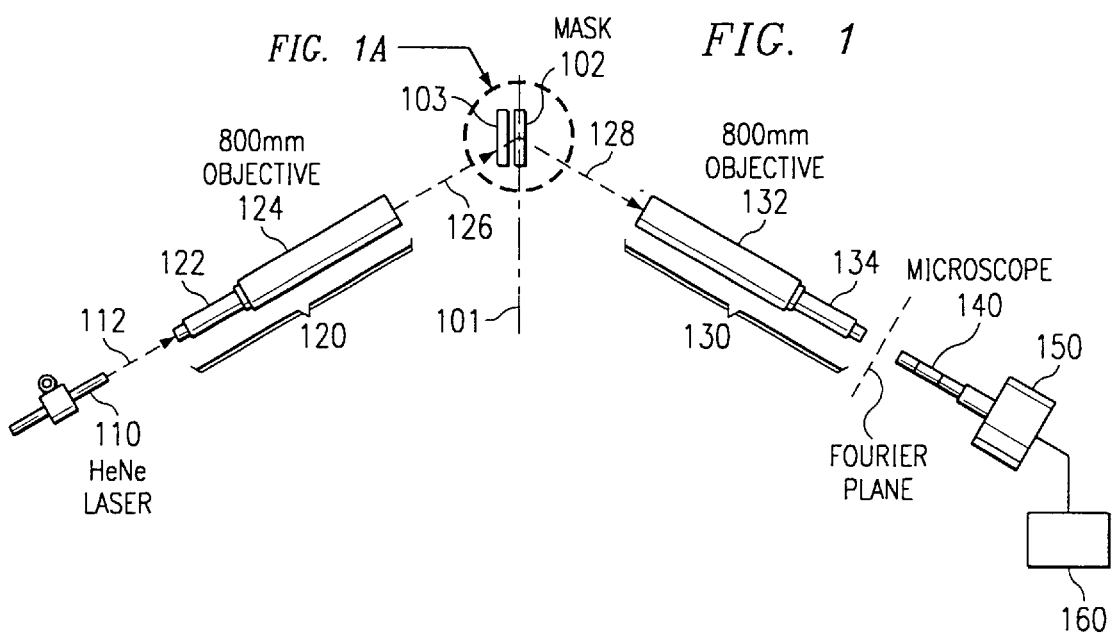
FIG. 1 shows one embodiment of an optical diagnostic system for measuring the characteristics of a phase mask for fabricating waveguide Bragg gratings.
Figure 1A:
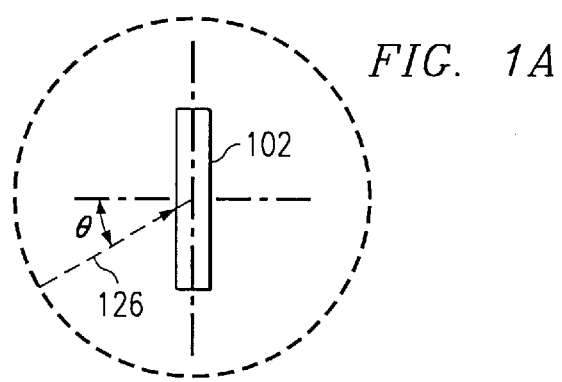
Figure 2:
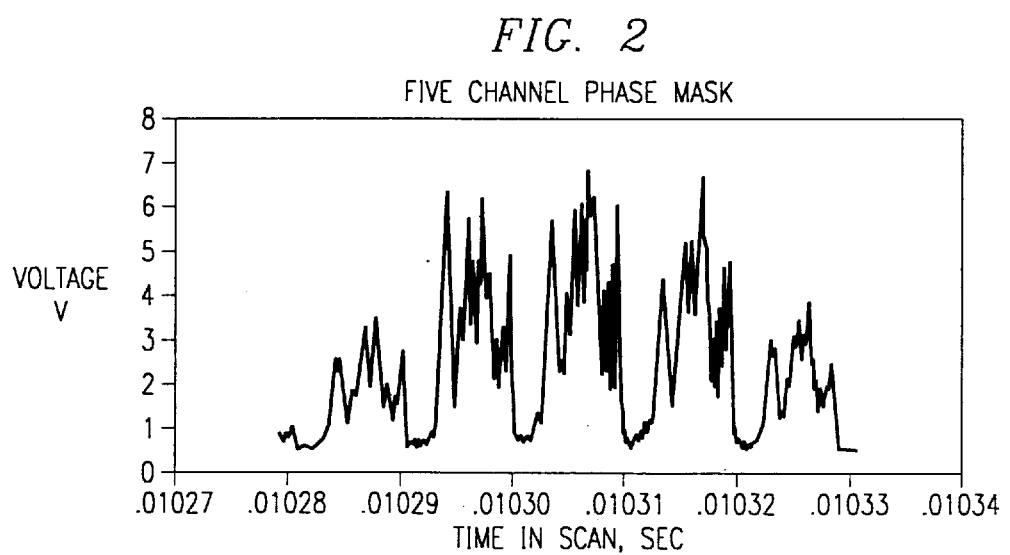
FIGS. 2, 3, 4, and 5 show measurements of a phase mask obtained from the optical diagnostic system in FIG. 1.
Figure 3:
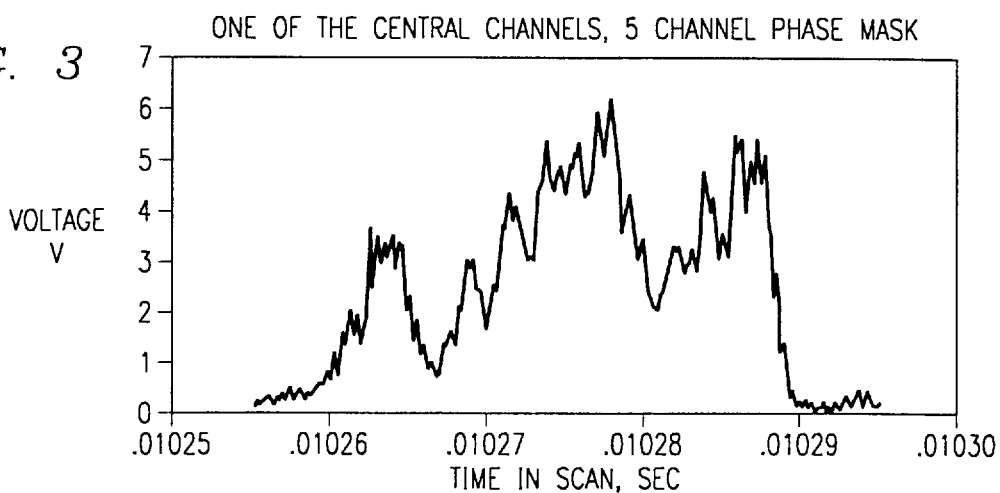
Figure 4:
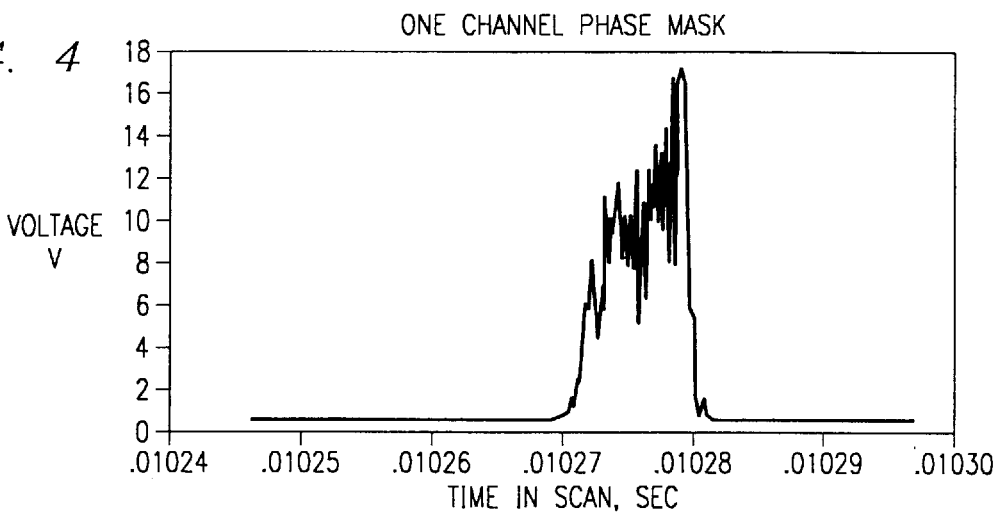
Figure 5:
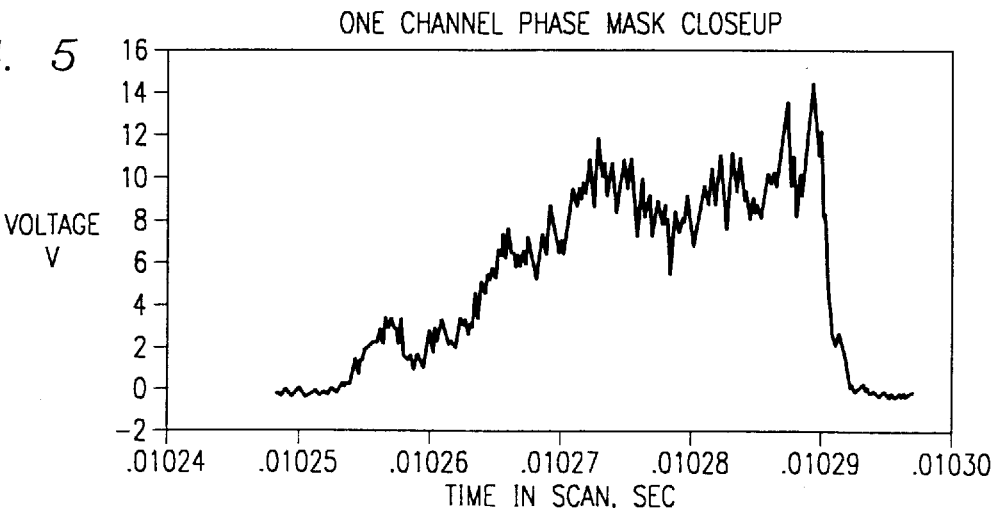

FIG. 1 shows an optical diagnostic system 100 for characterizing a phase mask 102 used for exposing a grating pattern to a fiber or a planar waveguide to form a waveguide Bragg grating. An illumination light source 110 is provided to produce an illumination beam 112 at a suitable illumination wavelength. A He—Ne or any convenient laser may be used as the light source 110. In general, the illumination wavelength is not required at a specific wavelength so long as the angle of the desired diffracted orders from the mask are suitable for measurement. An optical collimator 120, which may include lenses 122 and 124, can be used to expand and collimate the beam 112 to produce a collimated beam 126 with a proper size and beam profile for illumination.

The phase mask 102 is placed in a plane 101 in the optical path of the collimated beam 126 so that the beam 126 is incident to the surface of the phase mask 102 at a selected incident angle. A sample holder may be used to hold the phase mask 102 at the desired location. The phase mask 102 is generally a parallel plate formed of an optical transmissive material and with the grating pattern formed on one surface. Under illumination of the beam 126, the phase mask 102 diffracts the beam 126 to produce a diffracted beam emerging at the other side of the phase mask 102. In addition, multiple reflections between the front and back surfaces of the phase mask 102 may interfere with one another to produce interference patterns. The interference patterns are superimposed on the diffracted beam 128 and can cause unwanted distortion on the wavefront of the diffracted beam 128. To reduce the above adverse effect of the multiple reflections, the phase mask 102 may be tilted relative to the direction of the illumination beam 126 around a rotation axis orthogonal to the direction of diffraction of the phase mask grating, e.g., around 45 degrees. Under this illumination condition, the multiple reflected beams diverge from the grating region of the phase mask 102 so that they are not diffracted towards the direction of the diffracted beam 128 and the and thus do not interfere with detection of the diffracted beam 128.

The system 100 implements a collecting lens 130, which may be part of a telescope with lenses 132 and 134, on the other side of the phase mask 102 to receive the diffracted beam 128. The collecting lens 120 operates to focus one or more selected orders of the diffracted beam 128 produced by the phase mask 102 to a Fourier transform plane at the other side of the collecting lens 130. A microscope 140 is positioned after the Fourier transform plane of the lens 130 to receive and magnify the image in the Fourier transform plane to an imaging array 150, e.g., a CCD camera, as the equivalent Fourier plane to capture the image on the Fourier plane of the lens 130. An oscilloscope or other recording device 160 can be connected to the imaging array 150 to record one horizontal video line at a time to produce, an intensity plot across the equivalent Fourier plane for characterizing the phase mask 102. A calibrated goniometer may be used to hold the mask 102 so that the diffraction angle and hence the grating pitch can be measured. In general, optical systems other than the system 100 may be used to measure the phase mask 102 by capturing the far-field of the desired diffraction orders, such as the second, the fourth orders, etc.

Notably, the system 100 can be designed to select a second-order diffraction beam for detection. This design is in part based on the recognition that the spectrum of a fiber Bragg grating with a low reflectivity is determined by the Fourier transform of the periodic index modulation written in the fiber, and that the Fourier transform of the second-order diffraction beam, rather than the Fourier transform of the entire diffraction field of the phase mask 102, is a faithful reproduction of the fiber Bragg grating spectrum with high accuracy. Certainly, the optical detection part of the system 100 may be configured to receive and detect other diffractive orders to obtain additional information about the phase mask 102. This system thus can provide a valuable diagnostic tool for examining diffraction masks intended for fabrication of fiber Bragg gratings.

In the side illumination technique using a mask for writing fiber Bragg gratings, the interference in the fiber produced by the ±1 orders of the phase mask 102 is usually used to form the grating pattern in the fiber. Hence, when only the ±1 orders of the phase mask 102 are used to form the fiber grating, the pitch of the corrugation of the phase mask 102 is reduced by exactly a factor of two when written into the index modulation in the core of the fiber grating. This result generally makes it difficult to directly compare the far field diffraction pattern of the phase mask 102 with the intended low reflectivity response of the resultant fiber Bragg grating. The mask diagnostic system 100 provides one solution to this problem.

The following explains the basic operation of the diagnostic system 100. Assume the variation of the index of refraction inside the fiber Bragg grating along the longitudinal direction z of the underlying fiber to have the following form:

$$n(z)=n_0+n_g(z)\cos(k_{g0}z+\phi_g(z))=n_0+Re\{n_g(z)\exp[i(k_{g0}z+\phi_g(z))]\}, \quad (1)$$

where $n_0$ is the effective average index of refraction of the fiber core, $n_g(z)$ is the amplitude of the index modulation, $k_{g0}=2\pi/\lambda_{g0}$ is the central spatial frequency of the fiber grating index modulation, $\phi_g(z)$ is the phase of the deviation of the modulation from the central spatial frequency, and Re denotes the real part of the expression. The low-reflectivity response of this Bragg grating is given by the Fourier Transform of the complex index function:

$$R(f)=|\Im\{n_g(z)\exp[i\phi_g(z)]\}|^2, \quad (2)$$

where the frequency variable is defined by the Fourier transform after replacing z by the round trip time of reflection in the FBG $t=2n_0z/c$, and c is the speed of light. The phase mask that is used to expose the fiber with the above index grating has a corrugation function which has twice the period of the desired index modulation in the fiber, and whose phase variation is one half of that required in the fiber. Without loss of generality, this corrugation function may be assumed to be sinusoidal. Thus the relative height of the mask surface profile, with a peak to valley excursion of ±d, can be written as $$h(x)=d\sin([k_{g0}x+\phi_g(x)]/2)=d\sin(\theta_m(x)), \quad (3)$$

where the phase of the mask corrugation function is exactly one half of that required by the fiber Bragg grating, i.e., $$\theta_m(x) = \frac{1}{2}\theta_g(x) \equiv \frac{1}{2}(k_{g0}x + \phi_g(x)). \quad (4)$$

The transmitted near-field wave from the mask can be written as $$E_{nf}(x)=\exp[ik_0(n_{mask}-1)h(x)]=\exp[i\phi_0\sin(\theta_m(x))], \quad (5)$$

where $k_0$ is the illuminating k-vector, $n_{mask}$ is the index of refraction of the mask substrate, and $\phi_0=k_0(n_{mask}-1)d$. It is known that, $$\exp[ia\sin(\theta)]=\Sigma_{m=-\infty}^{\infty}J_m(a)\exp[im\theta], \quad (6)$$

where $J_m$ is the ordinary Bessel function of the $m^{th}$ order. Thus, with $a=\phi_0$ and $\theta=\theta_m$, the following can be obtained:

$$E_{nf}(x) = \sum_{m=-\infty}^{\infty} J_m(\phi_0)\exp\left[im\frac{1}{2}(k_{g0}x + \phi_g(x))\right] \quad (7)$$

Therefore, if only the second order (m=2) is considered and the mask is the assumed to be illuminated with an infinite plane wave, the following can be obtained:

$$E_{nf}^{(2)}(x)=J_2(\phi_0)\exp[i(k_{g0}x+\phi_g(x))]. \quad (8)$$

The underlying grating term ($\sim k_{g0}x$) determines the central angle of diffraction of the second diffraction order. The far-field intensity of the second diffraction order relative to its central position is then proportional to the Fourier Transform as follows:

$$E_{ff}^{(2)}(f) |\Im\{\exp[i\phi_g(x)]\}|^2, \quad (9)$$

where the far-field coordinate is dependent on the angular dispersion of the mask in the orientation being used. The deviation in the far-field diffraction angle can be expressed as $$\Delta\theta_{ff}=m\lambda_0 f/\cos\theta_{out}, \quad (10)$$

where m(=2) is the order of diffraction, $\lambda_0$ is the illumination wavelength, $\theta_{out}$ is the angle (from normal incidence) of diffraction off the mask, and f is the spatial frequency of a mask feature. For example, consider a sampling period for a sampled fiber Bragg grating of about 1 mm, illumination at 500 nm, and $\theta_{out}=30°$. The channel separation in the $2^{nd}$ order diffraction from the mask is about 2 mrad, or a far-field separation of 2 mm for a 1 m focal length.

The illumination of the beam 126 on the phase mask 102 may be controlled by a spatial light filter 103 placed in front of the phase mask 102 to facilitate the diagnostic measurement. For example, an apodizing amplitude mask 103 may be used to control the illumination intensity along the grating direction in the phase mask. Assuming the apodizing amplitude mask 103 has a variable transmission given by $n_g(x)$, the intensity incident on the phase mask 102 varies along its length as $n_g^2(x)$, and the field of the second-order diffracted beam is $$E_{ff}^{(2)}(f) |\Im\{n_g(x)\exp[i\phi_g(x)]\}|^2=|\Im\{n_g(x)\}\otimes\Im\{\exp[i\phi_g(x)]\}|^2 \quad (11)$$

Hence, as an example, if $n_g(x)$ is a rect function aperture of the mask, then Eq. (11) yields the convolution of a sinc function with Eq. (9). A comparison between Eqs. (2) and (11) suggests that the second order diffraction can give a complete replication of the sampling and individual channel behavior of an ideal low-reflectivity fiber Bragg grating fabricated from the mask.

In addition, other diffracted orders can be used to yield additional information about the phase mask. For example, if the fourth order (m=4) is instead imaged to the Fourier plane detector, Eq. (8) becomes $$E_{nf}^{(4)}(x) = J_4(\phi_0) \exp[i(2k_{g0}x + 2\phi_g(x))], \quad (12)$$

and Eq. (9) becomes $$E_{ff}^{(4)}(f) \propto |\Im\{\exp[i2\phi_g(x)]\}|^2. \quad (13)$$

If, for example, $\phi_g$ includes only $\pi$ phase shifts, the diffracted function will have $2\pi$ phase shifts and hence the effect of $\pi$ shifts on sampling should be eliminated (only the central channel should appear). This configuration may be used to provide a sensitive measurement of the accuracy of the $\pi$ phase shift and any residual random phase errors (such as E-beam lithography induced 'stitching' errors), since small inaccuracy can cause some residual reflectivity in the other channels.

FIGS. 2 through 5 show measurements based on the diagnostic system 100 in FIG. 1. A He—Ne laser was used as the light source 110 to produce the beam 112 at 542.5 nm. A short positive lens and a 800-mm telescope objective up to 120 mm in diameter were used to form the collimator 120. The collimation was tested with a shear plate. The collimated beam 126 was a truncated Gaussian with small amplitude ripples due to optics imperfections. The mask was tilted to receive the beam 126 at an angle of about 45 degrees orthogonal to the plane of diffraction. A second 800-mm telescope objective was used to focus the second order diffracted beam to a Fourier transform plane.

Most of the measured features shown in FIGS. 2 through 5 are invariant with adjustments to the setup, and therefore are likely caused by the phase mask itself. Some of the small amplitude features at high frequencies may be caused by video noise. The ripples in amplitude do not change when the edges of the phase mask are blocked, indicating that they are not due simply to ringing from the sharp cutoff at the edges of the mask.

An interesting test is to place a vertical block such as a screwdriver in various places in front of the mask, and observe the shadow in the transform plane. This shadow exists only because the mask is chirped. If a uniform mask is placed in the setup, a simple sin(x)/x function results, with a width determined by the width of the mask. This width is narrow and shows no features on magnification, and only dims when a block is placed in front, with accompanying sin(x)/x diffraction side lobes appearing to the side. With a chirped mask, the horizontal spatial dimension at the mask is equivalent to an appropriate "frequency" coordinate at the Fourier plane. It is also possible to see that the mask is nonlinearly chirped, by observing the width of the shadow and its rate of motion when the block is moved. For a fast chirp on the grating pattern, the width is larger and moves faster than for a slow chirp on the grating pattern. It may be possible to turn this observation into a rough quantitative measurement of the chirp by measuring horizontal position of a block in the mask plane and position of a shadow in the image plane.

Although the present disclosure only includes a few embodiments, it is understood that various modifications and enhancements may be made without departing from the following claims.

What is claimed is:

1. A method, comprising:

directing an illumination beam to a phase mask with a mask grating to produce a transmitted diffraction beam from diffraction by the mask grating; and detecting at least a second order diffraction beam of the transmitted diffraction beam to evaluate a spectrum of a waveguide Bragg grating formed based on an interference pattern produced by the phase mask grating.

2. The method as in claim 1, further comprising controlling a spatial property of the illumination beam received by the phase mask to facilitate the evaluation of the spectrum of the waveguide Bragg grating.

3. The method as in claim 2, wherein an intensity of the illumination beam on the phase mask is changed along the mask grating.

4. The method as in claim 2, wherein the intensity of illumination beam is a rect function along the mask grating.

5. The method as in claim 1, further comprising detecting at least another order of the transmitted diffraction beam to extract additional information of the phase mask and the associated waveguide Bragg grating.

6. The method as in claim 1, wherein a fourth order diffraction beam is detected to measure a phase error in the waveguide Bragg grating.

7. The method as in claim 1, further comprising blocking a portion of the illumination beam received by the phase mask at various positions to determine a spatial chirp property of the mask grating according to a shadow produced by the blocking.

8. The method as in claim 1, wherein the illumination beam is directed at an angle with respect to the phase mask so that an optical distortion in the transmitted diffraction beam is reduced.

9. A method, comprising:

directing an illumination beam to a phase mask with a mask grating to produce a transmitted diffraction beam from diffraction by the mask grating;

using a lens system to project the transmitted diffraction beam to a Fourier plane of the lens system; and detecting an optical image in the Fourier plane to extract information about a waveguide Bragg grating formed based on an interference pattern produced by the phase mask grating.

10. The method as in claim 9, wherein the detecting step includes measuring a second order diffraction beam of the transmitted diffraction beam to evaluate a spectrum of the waveguide Bragg grating.

11. The method as in claim 10, further comprising controlling a spatial intensity distribution of the illumination beam received by the phase mask to facilitate the evaluation of the spectrum of the waveguide Bragg grating.

12. The method as in claim 9, wherein the detecting step includes measuring a fourth order diffraction beam to detect a phase error in the waveguide Bragg grating.

13. The method as in claim 9, further comprising blocking a portion of the illumination beam received by the phase mask at various positions to determine a spatial chirp property of the mask grating according to a shadow produced by the blocking.

* * * * *